US007600991B1

(12) United States Patent
Schofield et al.

(10) Patent No.: US 7,600,991 B1
(45) Date of Patent: Oct. 13, 2009

(54) PLASTIC ROCK MAKING MACHINE

(76) Inventors: John Paul Schofield, 1847 Terrence Dr., Stafford, TX (US) 77477; Janet Ellen Schofield, 1847 Terrence Dr., Stafford, TX (US) 77477

( * ) Notice: Subject to any disclaimer, the term of this patent is extended or adjusted under 35 U.S.C. 154(b) by 639 days.

(21) Appl. No.: 11/492,315

(22) Filed: Jul. 25, 2006

Related U.S. Application Data

(62) Division of application No. 11/416,715, filed on May 3, 2006, now Pat. No. 7,115,178.

(60) Provisional application No. 60/681,030, filed on May 16, 2005.

(51) Int. Cl.
*B29C 49/00* (2006.01)

(52) U.S. Cl. .............................. 425/267; 425/DIG. 41; 425/DIG. 46; 425/407; 425/411

(58) Field of Classification Search ......... 425/264–269, 425/189, 193, 407, 411, DIG. 41, DIG. 46
See application file for complete search history.

(56) References Cited

U.S. PATENT DOCUMENTS

| | | | | |
|---|---|---|---|---|
| 3,219,735 | A | 11/1965 | Iverson | |
| 3,836,619 | A | 9/1974 | Volent | |
| 4,678,617 | A | 7/1987 | Sykes | |
| 4,734,302 | A | 3/1988 | Baskin | |
| 5,047,194 | A * | 9/1991 | Roufs et al. | 425/263 |
| 5,372,676 | A | 12/1994 | Lowe | |
| 5,543,100 | A | 8/1996 | Kluh et al. | |
| 5,588,196 | A | 12/1996 | Samuelson | |
| 5,817,162 | A | 10/1998 | Penrith | |
| 5,911,927 | A | 6/1999 | Roberts | |
| 6,132,820 | A | 10/2000 | Callahan | |

* cited by examiner

*Primary Examiner*—Yogendra Gupta
*Assistant Examiner*—Thu Khanh T Nguyen

(57) ABSTRACT

An apparatus for converting expended thermoplastic material, specifically empty plastic bottles, into artificial rocks, by placing the empty thermoplastic bottle in the apparatus between two sliding carriages, on each of which a rock has been mounted; and each carriage attached to a hydraulic jack, which, when the handle is pumped, moves the carriage toward the bottle which has been heated to malleability by heat lamps mounted above and sideways to the bottle, and the said heated, flexible bottle is squeezed between the two rocks mounted on the carriages, and then the bottle is rotated and the process repeated to give the bottle a rock shape. The rock shape may be further altered using a portable heat gun.

1 Claim, 1 Drawing Sheet

PLASTIC ROCK MAKING MACHINE

CROSS-REFERENCE TO RELATED APPLICATIONS

This application claims the benefit of provisional patent application. Ser. No. 60/681,030, filed May 16, 2005 by the present inventors.

This is a division of application Ser. No. 11/416,715, filed May 3, 2006 now U.S. Pat. No. 7,115,178.

FEDERALLY SPONSORED RESEARCH

Not Applicable

SEQUENCE LISTING OR PROGRAM

Not Applicable

BACKGROUND OF THE INVENTION

1. Field of the Invention

This invention generally relates to an apparatus for producing artificial rocks, specifically from expended thermoplastic containers.

2. Prior Art

Millions of thermoplastic containers are produced each year, used once, and thrown away. This creates an environmental problem as these containers are non-biodegradable and fill up an ever decreasing landfill space.

The present invention enables the conversion of such used containers into articles of renewed utility and thus enables an economically sound solution to the problem of waste disposal, while at the same time, providing a valued new article, specifically a lightweight, artificial rock.

When these rocks are installed on a substrate and mortar is put between them, they look like real rocks; with differing elevations out from the substrate, and different shades, shapes, textures, and sizes. This is completely different from mold-formed, uniform rocks.

Prior art discloses various attempts to recycle used materials, and to make artificial rocks from various materials, including concrete and plastics, but they all look like they come from a cookie cutter.

U.S. Pat. No. 4,678,617 (1987), to Sykes proposes converting two-liter soda bottles into building blocks. This produces a cookie cutter effect, as all the objects are the same size and shape. This process only uses, and so is limited to, soda bottles. Also, this would not be suitable for producing artificial rocks which would need to be of different shapes and sizes to appear real.

U.S. Pat. No. 5,911,927 (1999), to Roberts proposes a method of producing artificial rock formations using flexible molds of latex. This entails having to first make the master models, and then to make the actual molds, and does not address recycling.

U.S. Pat. No. 6,132,820 (2000), to Callahan proposes to make simulated rock from Portland Cement, Bentonite or Lime, polystyrene and water, poured into removable forms. This again, involves the use of molds and does not address recycling.

U.S. Pat. No. 5,543,100 (1966) to Kluh and Precht proposes to manufacture large scale artificial rocks from plastic reproductions. This would involve having to go to the sites to get the molds for the reproductions, and it does not address recycling.

3. Objects and Advantages

Accordingly, several objects and advantages of our invention are to convert used thermoplastic containers, specifically plastic bottles, into artificial rocks that look exactly like real rocks, but are a fraction of the cost of real rocks.

Another object is to do a great service to the environment by providing for the recycling of previously wasted, non-biodegradable plastic bottles, that take up limited landfill space.

A further object is to make the artificial rocks have different shapes, depths, and colors, like real rocks.

Thus the artificial rocks can be used for many non-structural uses, including, but not limited to, curbstones, waterfalls, lily ponds, garden planters, home wall coverings, rgck-stands for mailboxes, and numerous other items.

This invention can be made up as a portable waterfall unit with locking casters, which would be able to be used in any building without having to build a special foundation.

This portable unit would be especially practical and economical for use in commercial and residential buildings that are located in earthquake prone areas, thus saving the cost of very expensive foundations that would be required for a real masonry rock waterfall. A rock fountain or waterfall made with our plastic rocks created by the rock making machine, requires no foundation.

Further objects and advantages will become apparent from a consideration of the ensuing description and drawings.

SUMMARY

The present invention pertains to an apparatus for converting expended thermoplastic containers, specifically plastic bottles of all shapes and sizes into new and useful articles, specifically, plastic rocks.

In accordance with this invention, there is provided a machine that converts the empty plastic bottles into rock shapes by means of; sliding carriages mounted to hydraulic jacks, real rocks, and heat lamps.

The apparatus comprises two separate carriages on which two real rocks are mounted. Each carriage is mounted on rollers and attached to a hydraulic jack that moves back and forth by means of a handle mounted on the jack. The apparatus contains a turntable in between the two carriages for placement of the plastic bottle. The apparatus includes two heat lamps that heat the plastic bottle to the point where it becomes malleable.

The carriages containing the rocks are pushed in on both sides to squeeze the tow sides of the empty bottle, then pulled back off. The turntable is manually rotated and the process is repeated.

The empty bottle now has the shape of the rocks it was squeezed by. The rocks in the carriages can be continuously turned around, removed, and replaced with other rocks, thus ensuring that very few plastic rocks, if any, will be alike.

Once the plastic bottles have been rock shaped, they are sprayed with a bonding agent, coated with rough texture materials, and stained to have the appearance of natural rocks.

The plastic rocks can now be attached to any substrate by using a mixture of sand and cement, like real rocks, only at about 25% of real rock weight.

Finally, after the mortar has cured, and the rocks set in place, all the joints between the rocks can be filled in with a mixture of sand and cement, exactly like that used on real rocks.

Figure 1:
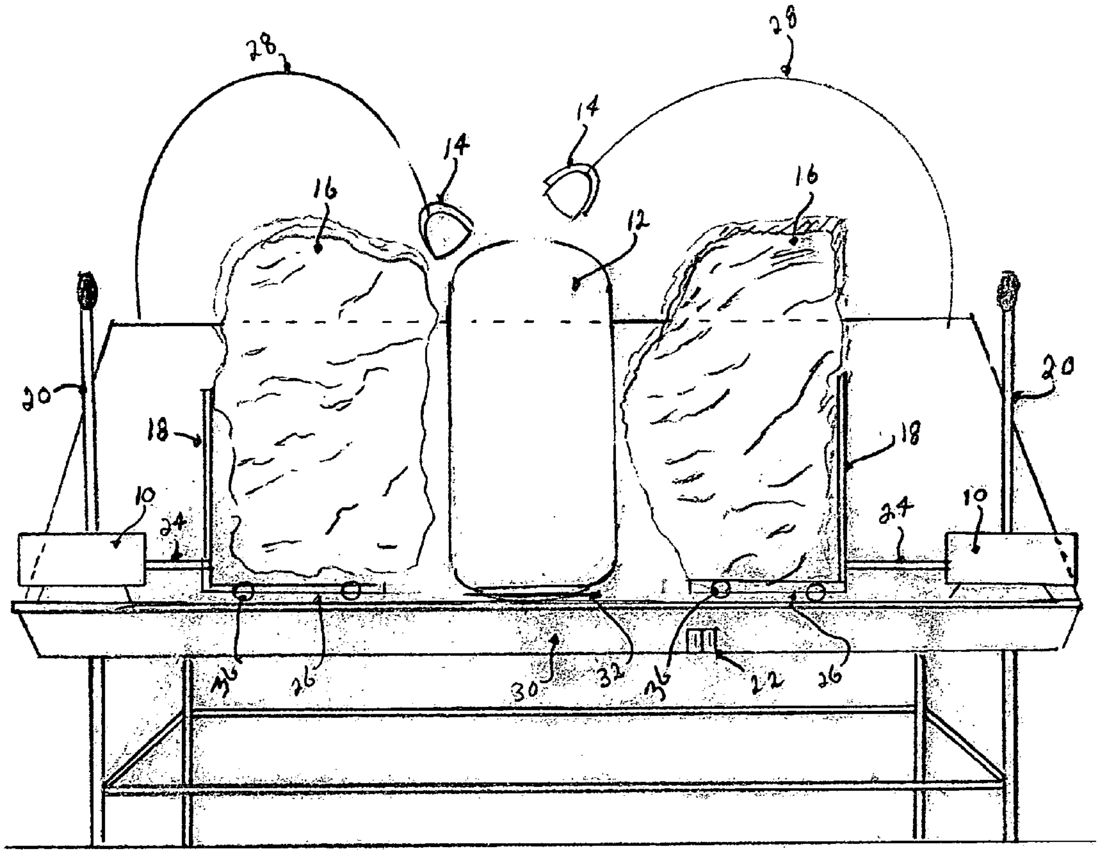
FIG. 1 is a somewhat perspective view of the apparatus embodying the present invention for converting empty plastic bottles into artificial rocks.

DETAILED DESCRIPTION ACCORDING TO THE PREFERRED EMBODIMENTS OF THE PRESENT INVENTION

FIG. 1 shows a preferred embodiment of the apparatus used to convert an empty plastic bottle 12 into an artificial rock.

The apparatus shown includes two sliding carriages 26, with carriage backs 18; the said carriages 26, mounted on rollers 36. Onto each carriage 26, with back 18, a real rock 16 is mounted.

Each carriage back 18, is attached to a hydraulic jack 10, by means of a connecting rod 24, with each jack 10 having a handle 20, which, when pumped, moves the carriage 26 with back 18 back and forth. The apparatus includes a turntable 32 which is comprised of pyrex in this embodiment.

The apparatus also includes two ultraviolet heat lamps 14, with each having a switch 22 to turn it on and off, and each said heat lamp 14 connected to the electric source by flexible electric line 28.

The apparatus is set on a table 30, which is comprised of steel in this embodiment, but may be made of other sturdy materials.

The empty plastic bottle 12 is placed on the turntable 32, in between the two carriages 26 on which real rocks have been mounted. The plastic bottle 12 used can vary in size, including, but not limited to, pint, liter, quart, two-liter, half gallon, gallon, and two gallon sizes, etc., and also in shape, such as round or square, to produce rocks of different shapes and sizes.

The heat lamps 14 are turned on by the switches 22 to melt the bottle 12 to a malleable point. The handles 20 on the hydraulic jacks 10 are pumped to move the carriages 26 containing the real rocks 16 toward the plastic bottle 12 from both sides, right and left, so as to squeeze the bottle 12 between the two rocks 16 used. The turntable 32 is then rotated, and the process repeated to give all the sides of the bottle a rock shape.

The plastic rock is now ready for coating, staining, and mounting.

We claim:

1. An apparatus for converting an expended plastic bottle into a rock comprising:

(a) two separate carriages onto each of which a real rock is mounted, (b) each said carriage mounted on rollers and attached to a hydraulic jack, (c) each said hydraulic jack moves back and forth by means of a handle mounted on the jack to push said rock containing carriages back and forth, (d) a turntable mounted in between the two said carriages for placement of a plastic bottle, (e) a heat source to melt the plastic bottle to a malleable point, comprising two heat lamps mounted on each side of said turntable, each of which has a switch to turn it on and off, (f) each said heat lamp connected to the electric source by a flexible electric line.

* * * * *